US005771267A

United States Patent [19]
Graef et al.

[11] Patent Number: 5,771,267
[45] Date of Patent: Jun. 23, 1998

[54] BURN-IN ACTIVITY MONITOR

[75] Inventors: Stefan Graef, Milpitas; Ludger Johanterwage, San Jose, both of Calif.

[73] Assignee: LSI Logic Corporation, Milpitas, Calif.

[21] Appl. No.: 727,257

[22] Filed: Oct. 8, 1996

[51] Int. Cl.$^6$ ........................................... G07C 3/02
[52] U.S. Cl. ............................................... 377/16
[58] Field of Search ......................... 377/16, 15

[56] References Cited

U.S. PATENT DOCUMENTS 5,189,314  2/1993  Georgiou et al. ..................... 377/49
5,250,941  10/1993  McGregor et al. ..................... 377/52
5,481,222  1/1996  Utz ........................................ 377/31

Primary Examiner—Margaret Rose Wambach

[57] ABSTRACT

According to the present invention, the invention relates to a semiconductor device having an activity monitor circuit formed thereon for monitoring the switching activity of signals generated by other circuits on the device during burn-in testing. In one embodiment, the activity monitor circuit includes means for detecting a present state of a signal; means for comparing the present state with a previous state of the signal; means for determining whether the state of the signal has switched a requisite number of times in a predetermined time period; and means for displaying the results of the determination.

14 Claims, 3 Drawing Sheets

BURN-IN ACTIVITY MONITOR

TECHNICAL FIELD

This invention relates generally to the testing of semiconductor devices, and more particularly, to a method for monitoring the activity of a semiconductor integrated circuit during burn-in.

BACKGROUND OF THE INVENTION

One of the final tests performed on integrated circuits before they are released for sale by the manufacturer is a dynamic "burn-in". In a dynamic burn-in test, the integrated circuit is placed on a burn-in board which allows input signals, referred to as test patterns, to be provided to the integrated circuits causing them to exercise the transistors in the various circuits formed on the device. The burn-in board is then placed into an oven so that the integrated circuit executes the patterns at an elevated temperature for a preset amount of time.

One of the main requirements of dynamic burn-in is to obtain at least an 80% toggle coverage. In other words, at least 80% of the transistors of the device will, at some point during the test, be placed into both on and off states. The toggle coverage which can be achieved by the pattern executed during dynamic burn-in is previously verified by simulation. However, in order to assure a high quality burn-in, the activity of each integrated circuit has to be monitored throughout the entire burn-in time. Due to the increasing complexity of the integrated circuit designs, it has become impractical to monitor the dynamic burn-in for each integrated circuit by manually probing and monitoring the relatively few outputs which are accessible from outside the oven during the burn-in.

Accordingly, it is an object of the invention to provide a method and apparatus for monitoring the switching activity of signals on the device. It is a further object of the invention to overcome other shortcomings in conventional burn-in testing and to provide additional improvements and advantages which will become apparent in view of the following disclosure.

SUMMARY OF THE INVENTION

One aspect of the invention relates to a semiconductor device having an activity monitor circuit formed thereon for monitoring the switching activity of signals generated by other circuits on the device during burn-in testing. In one embodiment, the activity monitor circuit comprises means for detecting a present state of a signal; means for comparing the present state with a previous state of the signal; means for determining whether the state of the signal has switched a requisite number of times in a predetermined time period; and means for displaying the results of the determination.

Another aspect of the invention relates to a method for burn-in testing of a semiconductor device having an activity monitor circuit formed thereon for monitoring the switching activity of signals generated by other circuits on the device. In one embodiment, the method comprises the steps of detecting a present state of a signal; comparing the present state with a previous state of the signal; determining whether the state of the signal has switched a requisite number of times in a predetermined time period; and displaying the results of the determination.

DETAILED DESCRIPTION OF EMBODIMENTS OF THE INVENTION

Figure 1:
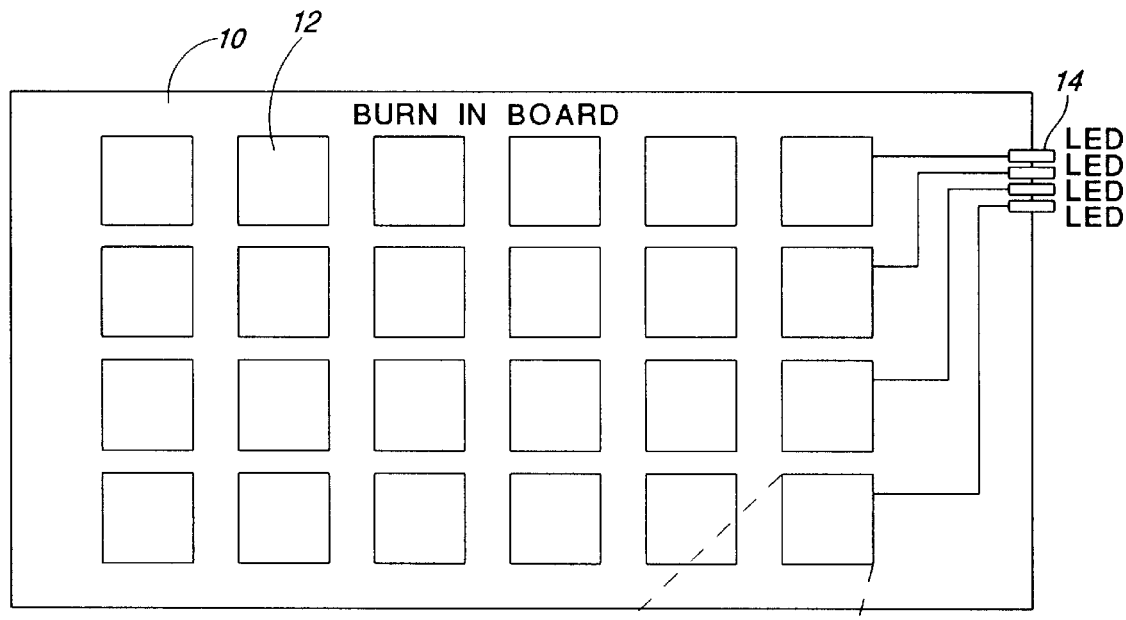
FIG. 1 shows a burn-in board according to an embodiment of the invention having a plurality of LED's for displaying the status of the integrated circuits.

Referring now to FIG. 1, there is shown a burn-in board according to an embodiment of the invention. In this case, burn-in board 10 holds a plurality of semiconductor integrated circuits 12 for burn-in testing. Burn-in board 10 is conventional in that it is provided with the chip holders, electrical traces and the inputs and outputs necessary to allow test patterns to be provided to the chips for execution during burn-in. Burn-in board 10 also comprises a plurality of LED's 14 which are driven by activity monitor circuitry provided on each of the integrated circuits according to embodiments of the present invention.

Figure 1A:
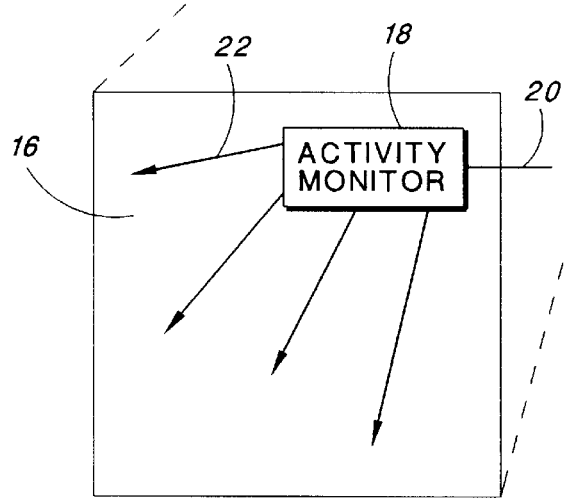
FIG. 1A is an expanded view of an integrated circuit having an activity monitor according to an embodiment of the invention.

FIG. 1A is a block diagram of an integrated circuit 16 having an activity monitor circuit 18 formed thereon. In this case, semiconductor 516 comprises numerous electronic circuits such as oscillators, memories, adders, multipliers, and other types of semiconductor circuits which are familiar to those of skill in the art. These circuits, generate and receive various internal signals, such as clocks, scan inputs, ram outputs, adder outputs, oscillator outputs, etc. In order to determine whether the various circuits on the integrated circuit are functioning properly, it is necessary to monitor the switching activity of the signals generated by the various circuits. More specifically, as is conventional in digital logic, each signal switches between one of two states, high and low. As the integrated circuit executes the test patterns applied to it during burn-in, the signals generated by the circuits switch between high and low as the transistors within the circuits switch on and off. Through computer simulation of the circuit design, the switching frequency of each signal, i.e., the number of times the signal switches states during a predefined time period, in response to the input patterns is known.

Therefore, according to an embodiment of the present invention, integrated circuit 16 is provided with activity monitor circuit 18. The activity monitor circuit 18 is coupled to nodes of the circuit which pass the signals generated by the various circuits on the chip to the activity monitor 18 through signal lines 22. The activity monitor 18 comprises circuits which count the number of state changes of each signal, and compares them to the number of changes which were predicted to occur over the measurement time period by the computer simulation. If the number of signal changes matches with the design specification, and therefore, with the programming of the monitor, then activity monitor 18 generates an appropriate signal on signal line 20.

Signal line 20 is used to provide the result of the monitoring by the activity monitor 18 to a display which is used to inform test engineers about the status of the chip. For example, in one embodiment of the invention, the signal 20 is provided to LED 14 on the burn-in board as described earlier. If all monitored signals are determined to be within specification, then signal 20 is high, and the corresponding LED 14 of the burn-in board is on. Otherwise, signal 20 is low and the LED is off. In this way, a simple glance at the burn-in board indicates whether the chip has failed the burn-in test. Of course, numerous other methods for displaying the status of the chip will occur to those of skill in the art. For example, signal 20 could be provided to an external computer which can display the results of the test on a CRT and/or record the results of the test in computer memory, such as RAM or disk, for later retrieval or print out.

Figure 2:
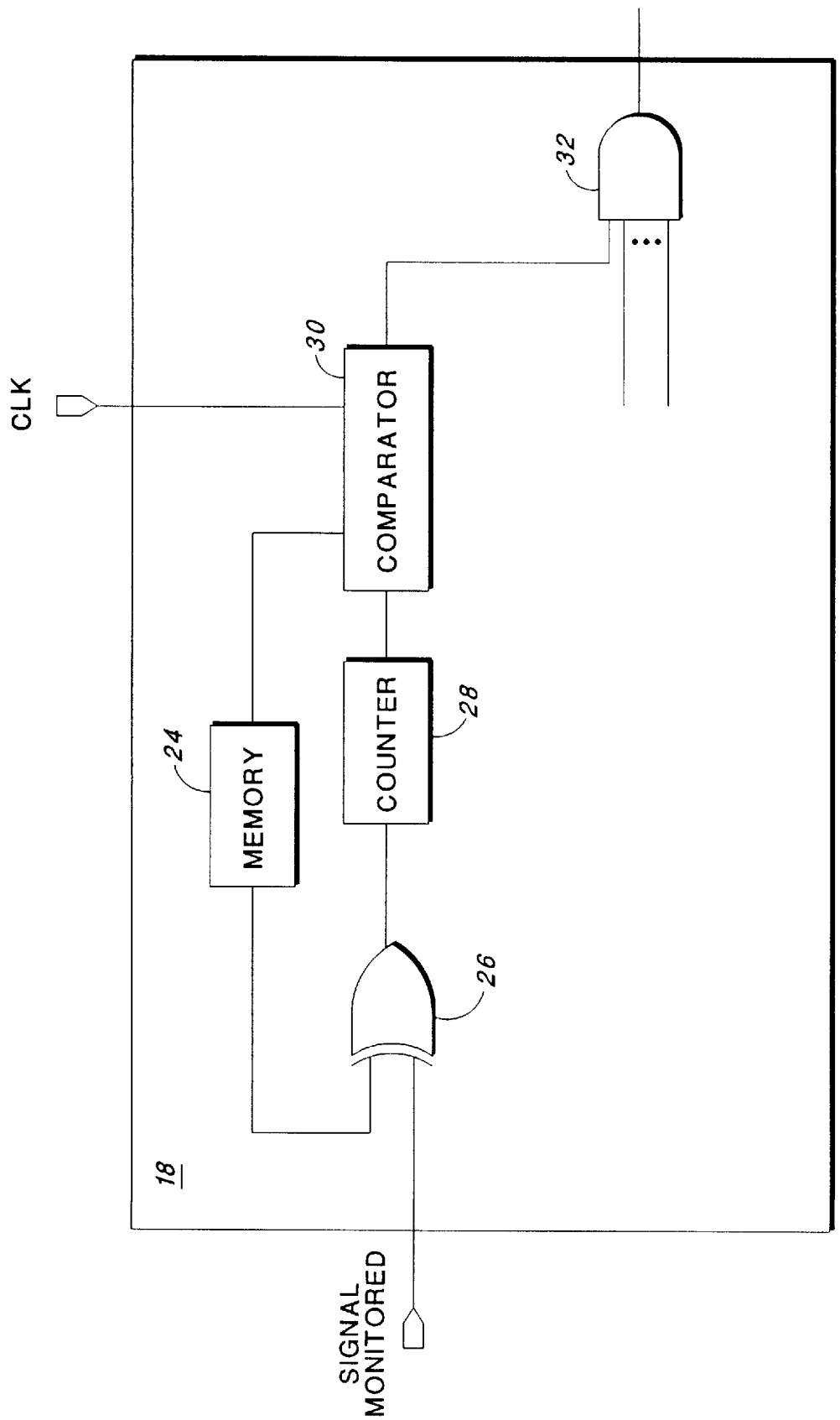
FIG. 2 is a block diagram showing an activity monitor according to an embodiment of the invention.

FIG. 2 is a more detailed schematic diagram of an activity monitor 18 according to an embodiment of the invention. In this case, the signal to be monitored is provided to one input of XOR gate 26. The other input is provided to memory 24. Memory 24 is used to store the previous state of the signal being monitored and the number of switches expected by the signal over the relevant measurement time period. XOR gate 26 functions to compare the present state of the signal being monitored with the previous state provided by memory 24. If the present state is different than the previous state, then the output of XOR gate 26 is high which drives counter 28. Counter 28 increments each time the signal being monitored switches state. The value of counter 28 is then provided to comparator 30 which compares the number of switches counted by counter 28 with the expected number of switches for the signal provided by memory 24. Comparator 30 keeps track of the measurement time period by receiving a clock signal CLK. If the number of switches counted by counter 28 matches the number of switches expected from memory 24, then the output of counter 30 is high. The output of comparator 30 is then provided to AND gate 32.

It will be understood that for each signal to be monitored, the combination of the circuit elements previously described will be duplicated and the comparator output for each signal being monitored will also be provided to AND gate 32. If all signals being monitored have switched the requisite number of times during the relevant time period, then all inputs to AND gate 32 will be high causing the output of AND gate 32 to go high and turn on one of the LED's on the burn-in board. Of course, it will be recognized that numerous variations of the circuit shown in FIG. 2 are possible according to other embodiments of the invention. Therefore, further embodiments will be described with respect to FIG. 3.

Figure 3:
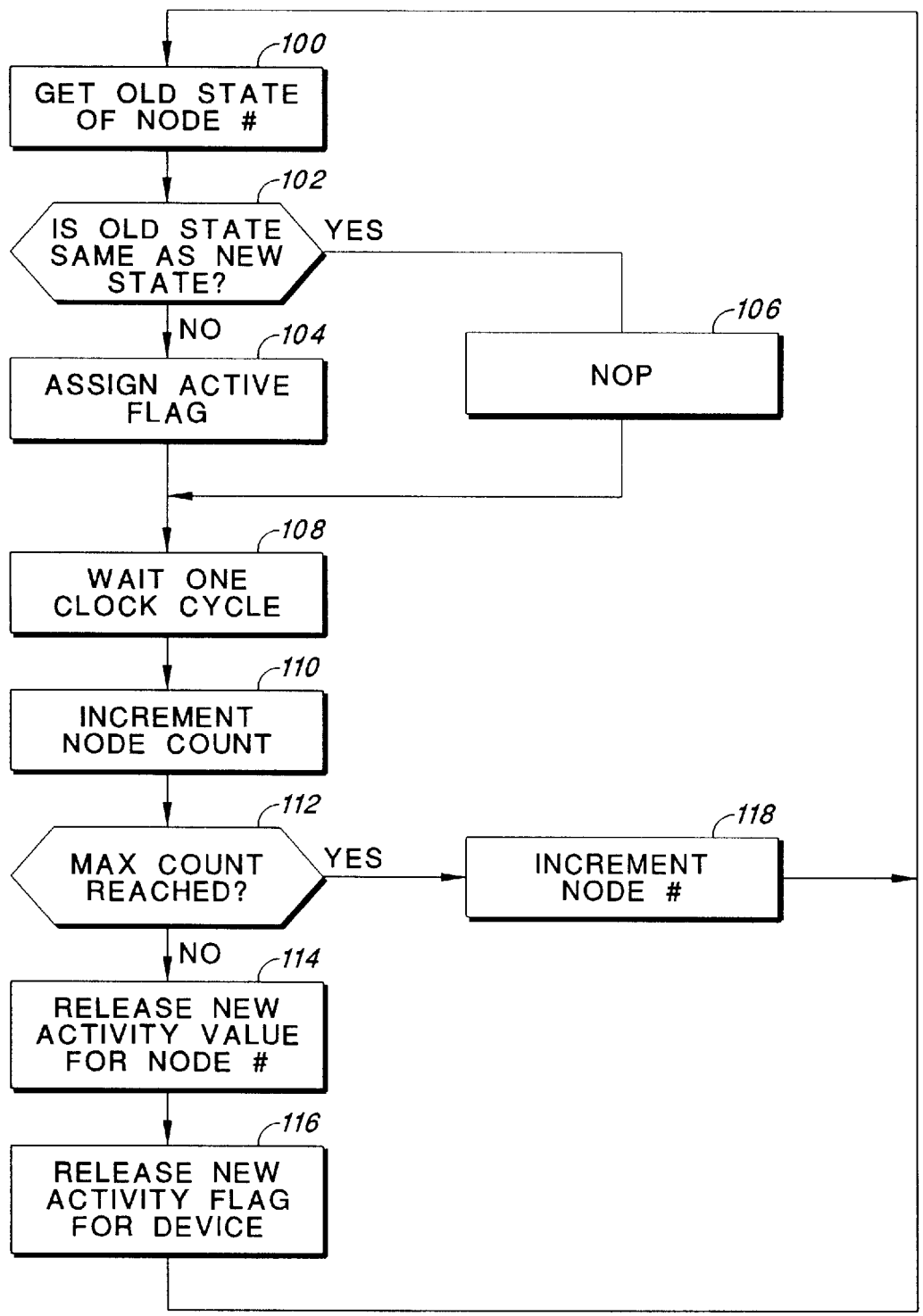
FIG. 3 is a flow chart according to one embodiment of the invention illustrating the operation of an activity monitor circuit.

FIG. 3 is a flow chart showing the operation of an activity monitor according to an embodiment of the invention. In this case, in step 100 the old state of the signal being monitored at a particular node is retrieved from memory. In step 102, the old state of the node is compared with the new state of the node. If the states are the same, then a NOP is performed and flow proceeds to step 108. If the states are different, then it is known that the signal has switched and an active flag is set in step 104.

In this case, the relevant measuring time period is one clock cycle. Therefore, in step 108 the activity monitor waits one clock cycle before proceeding to step 110 where the number of switches at the node is incremented by one.

If a maximum count has not been reached, then in step 114 a new activity value for the signal associated with a particular node is released to the state machine. Numerous methods used for releasing the new activity value will occur to those of skill in the art. For example, in one embodiment, a latch is provided which latches the value of the active flag when the process reaches step 114. The active flag itself is then cleared. The status of the latch is then checked in step 116 to determine whether the number of switches counted during the requisite time period is within specification for this node. In another embodiment, a memory circuit is provided to store the active flag. The memory will be designed such that when the active flag is cleared at the end of step 104, the memory retains the previous state of the active flag for one iteration. Thus, if the node fails to change state in step 102, when flow again reaches step 114, the memory will now be cleared to indicate a node failure.

When the maximum count for the particular node has been reached, flow proceeds from step 112 to step 118 in which the node number is incremented. In other words, the system is now satisfied that the first node is properly functioning and begins to check the next node to be monitored. Flow then proceeds back to step 100 where the state of the next node is evaluated in a similar fashion. This process continues until all nodes being monitored have been checked to determine they have switched the appropriate number of times during the requisite time period. In step 116, the activity flags for each of the nodes are gathered and, if the number of switches counted at each node is within specification, then a new activity flag for the entire integrated circuit is released to the state machine, enabling the activity monitor to drive the LED, or provide other suitable output as discussed previously. Of course, numerous ways will occur to those of skill in the art to release the activity flag for the entire integrated circuit. In one embodiment, if the output of each of the activity values for each node is latched high (assuming each node is good) then each of these outputs can be ANDed together and the resulting output used to turn on the LED.

While the present invention has been described with respect to the above embodiments, it is understood that various changes in form and detail may be made without departing from the scope and spirit of the present invention. All publications referenced herein are hereby incorporated by reference as though set forth in full.

What is claimed is:

1. A semiconductor device having an activity monitor circuit formed thereon for monitoring the switching activity of signals generated by other circuits on the device during burn-in testing, the activity monitor circuit comprising:
   means for detecting a present state of a signal;
   means for comparing the present state with a previous state of the signal;
   means for determining whether the state of the signal has switched a requisite number of times in a predetermined time period;
   means for displaying the results of the determination.

2. A semiconductor device as in claim 1 wherein the means for determining comprises means for assigning an active flag if the previous state of the signal is different than the present state.

3. A semiconductor device as in claim 2 wherein the means for determining further comprises means for waiting a predetermined number of clock cycles between comparing the present state and the previous state.

4. A semiconductor device as in claim 2 wherein the means for determining comprises means for releasing an activity value for the signal.

5. A semiconductor device as in claim 1 further comprising means for comparing an activity value for each signal being monitored to a desired activity value and releasing a new activity flag for the device in response to the comparison.

6. A semiconductor device as in claim 5 further comprising means for displaying the results of the determination is responsive to the new activity flag for the device.

7. A semiconductor device as in claim 5 wherein the means for displaying the results comprises generating a signal which activates an LED.

8. A method for burn-in testing of a semiconductor device having an activity monitor circuit formed thereon for monitoring the switching activity of signals generated by other circuits on the device, the method comprising:

detecting a present state of a signal;

comparing the present state with a previous state of the signal;

determining whether the state of the signal has switched a requisite number of times in a predetermined time period;

displaying the results of the determination.

9. A method as in claim 8 wherein the step of determining comprises assigning an active flag if the previous state of the signal is different than the present state.

10. A method as in claim 9 wherein the step of determining further comprises waiting a predetermined number of clock cycles between comparing the present state and the previous state.

11. A method as in claim 10 wherein the step of determining comprises releasing an activity value for the signal.

12. A method as in claim 8 further comprising comparing an activity value for each signal being monitored to a desired activity value and releasing a new activity flag for the device in response to the comparison.

13. A method as in claim 8 wherein displaying the results of the determination is responsive to the new activity flag for the device.

14. A method as in claim 13 wherein the step of displaying the results comprises generating a signal which activates an LED.

* * * * *